United States Patent [19]

Bearden, Jr. et al.

[11] 4,134,825

[45] Jan. 16, 1979

[54] HYDROCONVERSION OF HEAVY HYDROCARBONS

[75] Inventors: Roby Bearden, Jr.; Clyde L. Aldridge, both of Baton Rouge, La.

[73] Assignee: Exxon Research & Engineering Co., Florham Park, N.J.

[21] Appl. No.: 847,898

[22] Filed: Nov. 2, 1977

Related U.S. Application Data

[63] Continuation-in-part of Ser. No. 702,227, Jul. 2, 1976, abandoned.

[51] Int. Cl.² .................. C10G 13/06; B01J 27/04
[52] U.S. Cl. ................................. 208/108; 208/112; 208/213; 208/217; 252/431 C; 252/439; 252/467; 252/477 R
[58] Field of Search .............. 208/108, 112, 215, 216; 252/431 C, 467

[56] References Cited

U.S. PATENT DOCUMENTS

| 1,876,270 | 9/1932 | Zorn ............................ 252/431 R |
| 2,091,831 | 8/1937 | Pongratz et al. .................. 208/108 |
| 3,131,142 | 4/1964 | Mills .................................. 208/108 |
| 3,161,585 | 12/1964 | Gleim et al. ...................... 208/264 |
| 3,502,564 | 3/1970 | Hodgson ............................ 208/9 |
| 3,502,571 | 3/1970 | Stolfa ............................... 208/108 |

OTHER PUBLICATIONS

Bureau of Mines Bulletin 622 (1965) pp. 24–28.

Primary Examiner—C. Davis
Assistant Examiner—G. E. Schmitkons
Attorney, Agent, or Firm—Marthe L. Gibbons

[57] ABSTRACT

A catalytic hydroconversion process for a hydrocarbonaceous oil is effected by dissolving an oil-soluble metal compound in the oil, converting the compound to a solid, non-colloidal catalyst within the oil and reacting the oil containing the catalyst with hydrogen. Preferred compounds are molybdenum compounds.

20 Claims, 8 Drawing Figures

FIGURE I

MOLY CONCENTRATION EFFECT ON COLD LAKE HYDROCONVERSION

EFFECT OF CONTACT TIME ON BITUMEN HYDROCONVERSION
- 830°F, 2500+ PSIG HYDROGEN
- 350 WPPM Mo, NO PRETREAT

HYDROCONVERSION OF HEAVY HYDROCARBONS

CROSS REFERENCE TO RELATED APPLICATIONS

This application is a continuation-in-part of U.S. application Ser. No. 702,227 filed July 2, 1976 (now abandoned), the teachings of which are hereby incorporated by specific reference.

BACKGROUND OF THE INVENTION

1. Field of the Invention

This invention relates to a process for the hydroconversion of a heavy hydrocarbonaceous oil in the presence of a catalyst prepared in situ from trace amounts of metals added to the oil as oil-soluble metal compounds.

2. Description of the Prior Art

Hydrorefining processes utilizing dispersed catalysts in admixture with a hydrocarbonaceous oil are well known. The term "hydrorefining" is intended herein to designate a catalytic treatment, in the presence of hydrogen, of a hydrocarbonaceous oil to upgrade the oil by eliminating or reducing the concentration of contaminants in the oil such as sulfur compounds, nitrogenous compounds, metal contaminants and/or to convert at least a portion of the heavy constituents of the oil such as pentane-insoluble asphaltenes or coke precursors to lower boiling hydrocarbon products, and to reduce the Conradson carbon residue of the oil.

U.S. Pat. No. 3,161,585 discloses a hydrorefining process in which a petroleum oil chargestock containing a colloidally dispersed catalyst selected from the group consisting of a metal of Groups VB and VIB, an oxide of said metal and a sulfide of said metal is reacted with hydrogen at hydrorefining conditions. This patent teaches that the concentration of the dispersed catalyst, calculated as the elemental metal, in the oil chargestock is from about 0.1 weight percent to about 10 weight percent of the initial chargestock.

U.S. Pat. No. 3,331,769 discloses a hydrorefining process in which a metal component (Group VB, Group VIB, iron group metal) colloidally dispersed in a hydrocarbonaceous oil is reacted in contact with a fixed bed of a conventional supported hydrodesulfurization catalyst in the hydrorefining zone. The concentration of the dispersed metal component which is used in the hydrorefining stage in combination with the supported catalyst ranges from 250 to 2,500 weight parts per million (wppm).

U.S. Pat. No. 3,657,111 discloses a process for hydrorefining an asphaltene-containing hydrocarbon chargestock which comprises dissolving in the chargestock a hydrocarbon-soluble oxovanadate salt and forming a colloidally dispersed catalytic vanadium sulfide in situ within the chargestock by reacting the resulting solution, at hydrorefining conditions, with hydrogen and hydrogen sulfide.

U.S. Pat. No. 3,131,142 discloses a slurry hydrocracking process in which an oil soluble dispersible compound of Groups IV to VIII is added to a heavy oil feed. The catalyst is used in amounts ranging from about 0.1 to 1 weight percent, calculated as the metal, based on the oil feed.

U.S. Pat. No. 1,876,270 discloses the use of oil soluble organometallic compounds in thermal cracking or in destructive hydrogenation (hydrocracking) of hydrocarbons to lower boiling products.

U.S. Pat. No. 2,091,831 discloses cracking or destructive hydrogenation carried out in the presence of oil soluble salts of acid organic compounds selected from the group consisting of carboxylic acids and phenols with a metal of Group VI and Group VIII of the Periodic Table. The oil soluble salt is used in amounts between 4 and 20 weight percent based on the feed.

It has now been found that the addition of a minor amount (i.e. less than 1000 weight parts per million (wppm), calculated as the metal) of an oil-soluble compound of metals of Groups IVB, VB, VIB, VIIB and VIII of the Periodic Table of Elements and their conversion products in the oil yield catalysts which are effective in a minor amount for the hydroconversion of hydrocarbonaceous oils without the necessity of utilizing a conventional supported catalyst in combination with the minor amount of dispersed catalyst in the hydroconversion zone.

The term "hydroconversion" is used herein to designate a catalytic process conducted in the presence of hydrogen in which at least a portion of the heavy constituents and coke precursors (as measured by Conradson carbon residue) of the hydrocarbonaceous oil is converted to lower boiling hydrocarbon products while simultaneously reducing the concentration of nitrogenous compounds, sulfur compounds and metallic contaminants.

SUMMARY OF THE INVENTION

In accordance with the invention, there is provided a process for hydroconverting a heavy hydrocarbon oil chargestock having a Conradson carbon content of at least 5 weight percent, which comprises: (a) adding to said chargestock an oil-soluble metal compound in an amount ranging from about 10 to about 950 weight parts per million, calculated as the elemental metal, based on said oil chargestock, said metal being selected from the group consisting of Groups IVB, VB, VIB, VIIB and VIII of the Periodic Table of Elements and mixtures; (b) converting said oil-soluble metal compound to a solid, non-colloidal catalyst within said oil in the presence of a hydrogen-containing gas by heating said oil to an elevated temperature, said catalyst comprising from about 10 to about 950 weight parts per million of said added metal, calculated as the metal, based on said oil chargestock; (c) reacting the oil containing said catalyst with hydrogen under hydroconversion conditions, in a hydroconversion zone, to effect at least a 50 percent conversion of said Conradson carbon content of said chargestock, and (d) recovering a hydroconverted hydrocarbon oil.

DETAILED DESCRIPTION OF THE INVENTION

Figure 1:
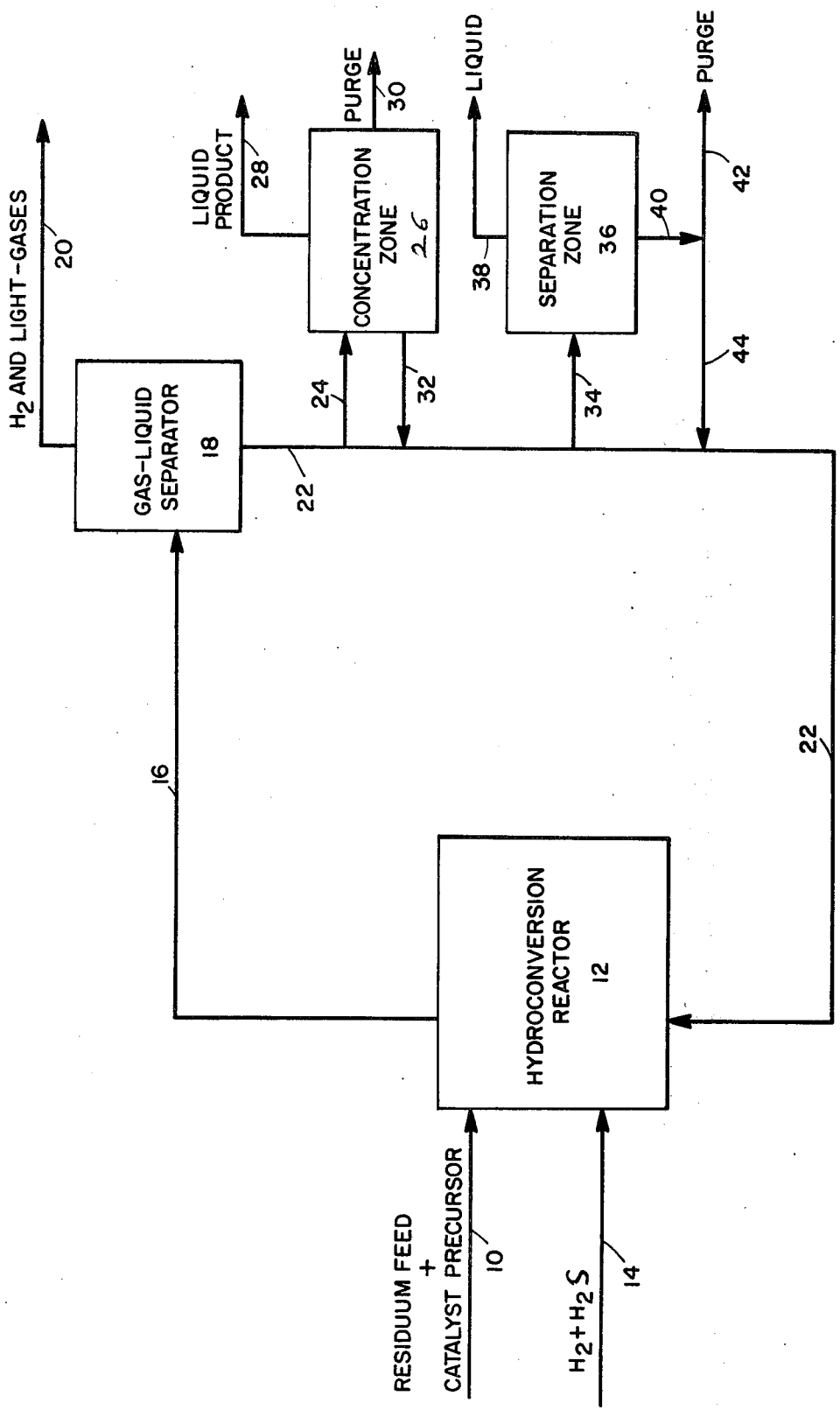
FIG. 1 is a schematic flow plan of one embodiment of the invention.

The process of the invention is generally applicable to heavy hydrocarbonaceous oils. Suitable heavy hydrocarbonaceous oil chargestocks include heavy mineral oil; whole or topped petroleum crude oils, including heavy crude oils; polynuclear aromatics such as asphaltenes, residual oils such as petroleum atmospheric distillation tower residua (boiling above about 650° F., i.e. 343.33° C.) and petroleum vacuum distillation tower residua (vacuum residua, boiling above about 1,050° F., i.e. 565.56° C.); tars; bitumen; tar sand oils; shale oils. The process is particularly well suited to heavy crude oils and residual oils which generally contain a high content of metallic contaminants (nickel, iron, vanadium) usually present in the form of organometallic compounds, e.g. metalloporphyrins, a high content of sulfur compounds, a high content of nitrogenous compounds and a high Conradson carbon residue. The metal content of such oils may range up to 2,000 wppm or more and the sulfur content may range up to 8 weight percent or more. The API gravity at 60° F. of such feeds may range from about $-5°$ API to about $+35°$ API and the Conradson carbon residue of the heavy feeds will generally be at least about 5 weight percent, preferably from about 5 to about 50 weight percent, more preferably from about 10 to about 50 weight percent (as to Conradson carbon residue, see ASTM test D-189-65). Preferably, the feedstock is a heavy hydrocarbon oil having at least 10 weight percent of material boiling above 1,050° F. (565.56° C.) at atmospheric pressure, more preferably having at least about 25 weight percent of material boiling above 1,050° F. (565.56° C.) at atmospheric pressure.

To the heavy hydrocarbon oil chargestock is added from about 10 to about 950 wppm, preferably from about 50 to about 300 wppm, more preferably from about 50 to about 200 wppm of an oil soluble metal compound, wherein the metal is selected from the group consisting of Groups IVB, VB, VIB, VIIB, VIII and mixtures thereof of the Periodic Table of Elements, said weight being calculated as if the compound existed as the elemental metal, based on the initial oil chargestock.

Suitable oil-soluble metal compounds convertible (under process conditions) to solid, non-colloidal catalysts include (1) inorganic metal compounds such as halides, oxyhalides, heteropoly acids (e.g. phosphomolybdic acid, molybdosilicic acid); (2) metal salts of organic acids such as acyclic and alicyclic aliphatic carboxylic acids containing two or more carbon atoms (e.g. naphthenic acids); aromatic carboxylic acids (e.g. toluic acid); sulfonic acids (e.g. toluenesulfonic acid); sulfinic acids; mercaptans; xanthic acid; phenols, di and polyhydroxy aromatic compounds; (3) organometallic compounds such as metal chelates, e.g. with 1,3-diketones, ethylene diamine, ethylene diamine tetraacetic acid, phthalocyanines, etc.; (4) metal salts of organic amines such as aliphatic amines, aromatic amines, and quaternary ammonium compounds.

The metal constituent of the oil-soluble metal compound that is convertible to a solid, non-colloidal catalyst is selected from the group consisting of Groups IVB, VB, VIB, VIIB and VIII and mixtures thereof of the Periodic Table of Elements, in accordance with the table published by E. H. Sargent and Company, copyright 1962, Dyna Slide Company, that is, titanium, zirconium, vanadium, niobium, tantalum, chromium, molybdenum, tungsten, manganese, rhenium, iron, cobalt, nickel and the noble metals including platinum, iridium, palladium, osmium, ruthenium and rhodium. The preferred metal constituent of the oil soluble metal compound is selected from the group consisting of molybdenum, vanadium and chromium. More preferably, the metal constituent of the oil-soluble metal compound is selected from the group consisting of molybdenum and chromium. Most preferably, the metal constituent of the oil-soluble metal compound is molybdenum. Preferred compounds of the given metals include the salts of acyclic (straight or branched chain) aliphatic carboxylic acids, salts of alicyclic aliphatic carboxylic acids, heteropolyacids, carbonyls, phenolates and organo amine salts. The more preferred metal compounds are salts of alicyclic aliphatic carboxylic acids such as metal naphthenates. The most preferred compounds are molybdenum naphthenate, vanadium naphthenate, and chromium naphthenate.

When the oil-soluble metal compound is added to the hydrocarbonaceous chargestock, it first dissolves in the oil and subsequently, under pretreatment or under hydroconversion conditions herein described, is converted to a solid, non-colloidal catalyst comprising from about 10 to about 950 wppm, preferably from about 50 to about 300 wppm, more preferably from about 50 to about 200 wppm of the same metal or metals as the metal or metals added as oil soluble compounds, calculated as the elemental metal, based on the oil chargestock.

Various methods can be used to convert the oil-soluble metal compound in the oil to a catalyst. One method (pre-treatment method) of forming a catalyst from the oil-soluble metal compound of the present invention is to heat the solution of the metal compound in the hydrocarbon chargestock to a temperature ranging from about 325° C. to about 415° C. and at a pressure ranging from about 500 to about 5,000 psig in the presence of a hydrogen-containing gas. Preferably the hydrogen-containing gas also comprises hydrogen sulfide. The hydrogen sulfide may comprise from about 1 to about 90 mole percent, preferably from about 2 to about 50 mole percent, more preferably from about 3 to about 30 mole percent, of the hydrogen-containing gas mixture. The thermal treatment in the presence of hydrogen or in the presence of hydrogen and hydrogen sulfide is believed to convert the metal compound to the corresponding metal-containing solid, non-colloidal products which are catalytically active and act as coking inhibitors. The resulting catalyst contained within the oil charge is then introduced into a hydroconversion zone which will be subsequently described.

A preferred method of converting the oil-soluble metal compound of the present invention to a catalyst is to react the solution of the compound in oil with a hydrogen-containing gas at hydroconversion conditions to produce the catalyst in the chargestock in situ in the hydroconversion zone. Preferably, the hydrogen-containing gas comprises from about 1 to about 10 mole percent, more preferably from about 2 to 7 mole percent, hydrogen sulfide. The conversion of the metal compound in the presence of the hydrogen-containing gas or in the presence of the hydrogen and hydrogen sulfide is believed to produce the corresponding metal-containing solid, non-colloidal catalyst. Whatever the exact nature of the resulting metal-containing catalyst, the resulting metal component is a catalytic agent and a coking inhibitor.

When an oil-soluble molybdenum compound is used as the catalyst precursor, the preferred method of converting the oil-soluble metal compound is in situ in the hydroconversion zone, without any pretreatment.

The hydroconversion zone is maintained at a temperature ranging from about 343° to 538° C. (650° to 1000° F.), preferably from about 426° to 482° C. (799° to 900° F.), more preferably from about 440° to 468° C. (824° to 875° F.), and at a hydrogen partial pressure ranging from about 500 to about 5,000 psig, preferably from about 1,000 to about 3,000 psig. Contact of the solution under the hydroconversion conditions in the reaction zone with the hydrogen-containing gas converts the metal compound to the corresponding metal catalyst in situ while simultaneously producing a hydroconverted oil. The hydroconverted oil containing solids is removed from the hydroconversion reaction zone. The solids may be separated from the hydroconverted oil by conventional means, for example, by settling or centrifuging or filtration of the slurry. At least a portion of the separated solids or solids concentrate may be recycled directly to the hydroconversion zone or recycled to the hydrocarbonaceous oil chargestock. The space velocity, defined as volumes of oil feed per hour per volume of reactor (V/hr./V), may vary widely depending on the desired hydroconversion level. Suitable space velocities may range broadly from about 0.1 to 10 volumes of oil feed per hour per volume of reactor, preferably from about 0.25 to 6 V/hr./V, more preferably from about 0.5 to 2 V/hr./V. The process of the invention may be conducted either as batch or as continuous type operation.

DESCRIPTION OF THE PREFERRED EMBODIMENT

The preferred embodiment will be described with reference to accompanying FIG. 1.

Referring to FIG. 1, a petroleum atmospheric residuum feed, that is, a fraction having an atmospheric pressure boiling point of 650° F.+ (343.3° C.+) containing less than 500 wppm of added oil-soluble metal compound, for example, molybdenum naphthenate, calculated as the elemental metal based on the initial residuum feed, is introduced by line 10 into a hydroconversion reactor 12 at a space velocity of 0.5 to 2 volumes of feed per hour per volume of reactor. A gaseous mixture comprising hydrogen and from about 2 to 7 mole percent hydrogen sulfide is introduced into reactor 12 by line 14. The hydroconversion reaction zone in reactor 12 is maintained at a temperature ranging from about 824° to 875° F. (440° to 468° C.) and under a hydrogen partial pressure ranging from about 1000 to 3000 psig. The hydroconversion reactor effluent is removed by line 16. The effluent comprises a hydroconverted oil product, gases, and a solid residue.

The effluent is introduced into a gas-liquid separator 18 where hydrogen and light hydrocarbons are removed overhead through line 20. Three preferred process options are available for the liquid stream containing dispersed catalyst solids which emerges from separator vessel 18 via line 22. In process option to be designated "A", the liquid-solids stream is fed by line 24 to concentration zone 26 whereby means, for example, of distillation, solvent precipitation or centrifugation, the stream is separated into a clean liquid product, which is withdrawn through line 28, and a concentrated slurry (i.e. 20 to 40% by weight) in oil. At least a portion of the concentrated slurry can be removed as a purge stream through line 30, to control the buildup of solid materials in the hydroconversion reactor, and the balance of the slurry is returned by line 32 and line 22 to hydroconversion reactor 12. The purge stream may be filtered subsequently to recover catalyst and liquid product or it can be burned or gasified to provide, respectively, heat and hydrogen for the process.

In the process option to be designated "B", the purge stream from concentration zone 26 is omitted and the entire slurry concentrate withdrawn through line 32 is fed to separation zone 36 via lines 22 and 34. In this zone, a major portion of the remaining liquid phase is separated from the solids by means of centrifugation, filtration or a combination of settling and drawoff, etc. Liquid is removed from the zone through line 38 and solids through line 40. At least a portion of the solids and associated remaining liquid are purged from the process via line 42 to control the build-up of solids in the process and the balance of the solids are recycled to hydroconversion reactor 12 via line 44 which connects to recycle line 22. The solids can be recycled either as recovered or after suitable cleanup (not shown) to remove heavy adhering oil deposits and coke.

In option designated "C", the slurry of solids in oil exiting from separator 18 via line 22 is fed directly to separation zone 36 by way of line 34 whereupon solids and liquid product are separated by means of centrifugation or filtration. All or part of the solids exiting from vessel 36 via line 40 can be purged from the process through line 42 and the remainder recycled to the hydroconversion reactor. Liquid product is recovered through line 38. If desired, at least a portion of the heavy fraction of the hydroconverted oil product may be recycled to the hydroconversion zone. The following examples are presented to illustrate the invention.

EXAMPLES

Several sets of comparative hydroconversion experiments were made. The experimental apparatus and procedures used are summarized in Table 1. Detailed inspections on various feeds used in these experiments are listed in Table 2. Table 3 identifies the catalysts and catalyst precursors used in these experiments.

Table 4 shows the effectiveness of catalysts prepared in situ from oil-soluble compounds of various metals relative to catalyst-free control runs. All of the metals tabulated were effective but vanadium, chromium and molybdenum are preferred based on overall ability to suppress coke and gas formation while giving attractive levels of desulfurization, demetallization and Conradson carbon conversion. Molybdenum is most preferred. It should be noted that in view of prior art teachings, e.g. in U.S. Pat. No. 3,825,488, regarding the ineffectiveness of chromium, it was found unexpectedly that within the metal concentration range of the present invention and under the conditions of the present invention, chromium was effective and very nearly equivalent to molybdenum.

The experimental runs shown in Table 5 show that catalysts derived from nickel, cobalt and vanadium are improved by a brief pretreat in situ with a hydrogen and hydrogen sulfide-containing gas for optimum activity. Similar results (not shown) were obtained with iron and tungsten catalysts. As will be noted in Tables 6 and 7, molybdenum does not require in situ pretreatment for optimum activity.

A set of runs utilizing an Athabasca bitumen feed is summarized in Table 6. The set of runs shown in Table 6 shows that molybdenum catalysts of the present invention do not require pretreatment with a hydrogen sulfide-containing gas to attain optimum activity (compare run 1R-12 with 1R-11). Furthermore, run 1R-14 shows that pretreatment of any sort is not necessary for the given molybdenum compounds. This result was unexpected in view of the pretreatment improvement shown in Table 5 when other metal compounds were used as catalyst precursors. Run 1R-17 shows that pretreating with $H_2S$ in the absence of hydrogen gives a catalyst that is inferior to those obtained when the pretreatment gas contains hydrogen. Specifically, relative to runs 1R-12 and 1R-11, it is seen that the catalyst of run 1R-17 is inferior in suppressing coke formation and in promoting Conradson carbon conversion. For comparison, run 8R-52 is a molybdenum-free control run.

In Table 7 are summarized results of experiments made with Cold Lake Crude. These runs show that molybdenum does not require pretreatment with hydrogen sulfide-containing gas to attain optimum activity. Compare run 1R-73 ($H_2$ only pretreat) with 1R-45 ($H_2$ + $H_2S$). It is shown further that pretreatment in the absence of hydrogen, either with pure $H_2S$ (run 1R-67) or under nitrogen pressure (run 1R-75) gave less effective catalysts than obtained with hydrogen in the pretreatment gas (run 1R-73). This result, as well as the comparable data of Table 6, showing that hydrogen is a beneficial component in the pretreatment step was unexpected in view of prior art teachings (see U.S. Pat. No. 3,165,463, columns 5 and 8 and U.S. Pat. No. 3,196,104, column 4) which teach that a reducing atmosphere, and in particular, free hydrogen, will lead to inferior catalyst performance if present in the catalyst activation or pretreat step, albeit at different pretreatment conditions than those used in the present invention.

Figure 2:
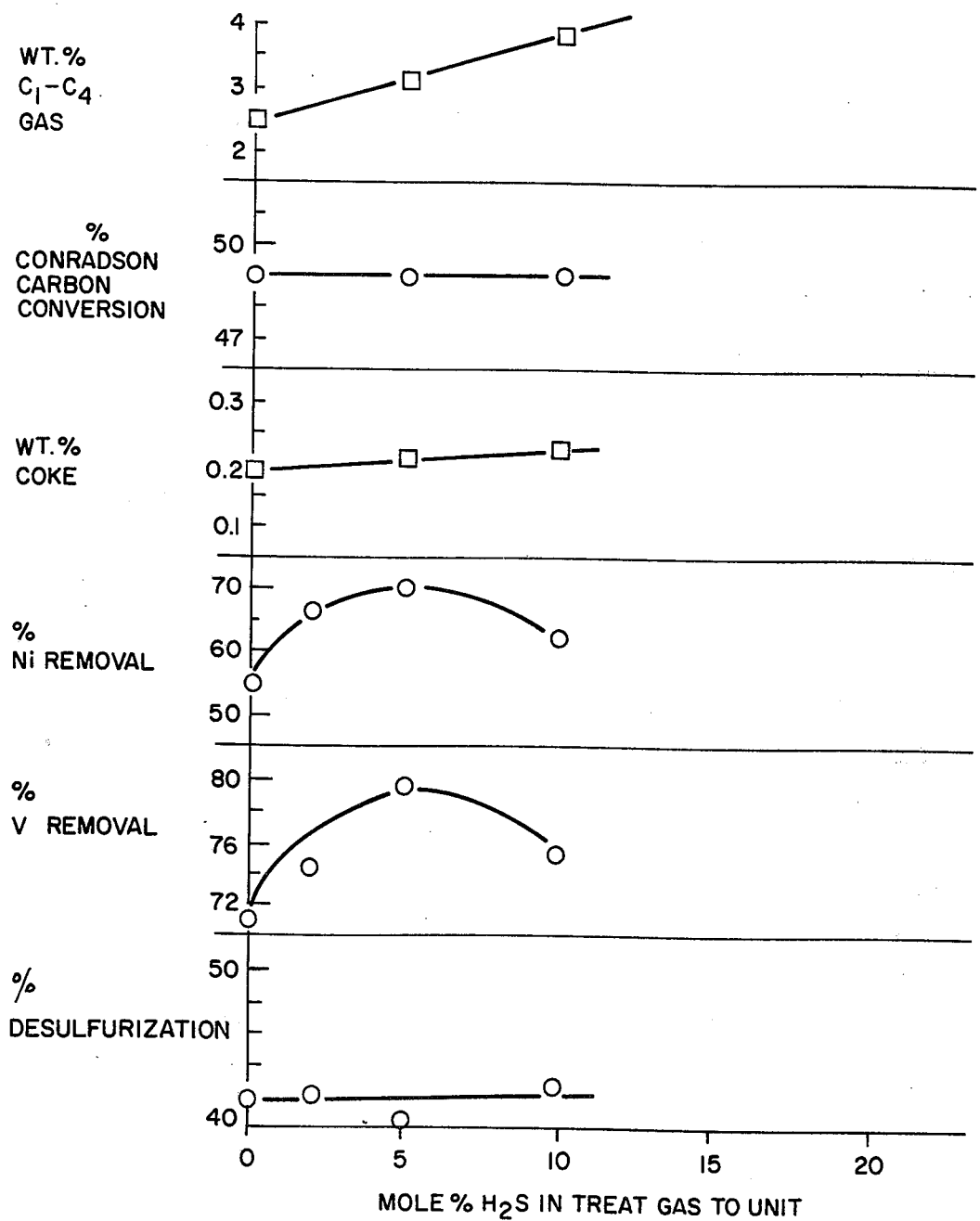
FIG. 2 is a plot showing the hydroconversion response of an Athabasca bitumen feed, containing 350 wppm molybdenum, to the concentration of $H_2S$ in the hydrogen fed to the hydroconversion reactor.

FIG. 2 is a plot which shows the hydroconversion response of an Athabasca bitumen feed containing 350 wppm molybdenum added to the feed as molybdenum-naphthenate, to the concentration of $H_2S$ in the hydrogen containing gas introduced into the hydroconversion reactor. Pretreatment was not employed in this run series. The hydroconversion runs were conducted in a continuous autoclave unit at a temperature of 830° F. (443.33° C.) at an oil space velocity of about 0.94 to 1.0 V/Hr./V and at a hydrogen containing gas treat rate of about 4000 standard cubic feet of gas per barrel of oil. The treat gas was used once through. The resulting continuous unit data show that there is an optimum $H_2S$ concentration between about 2 and 5 mole percent $H_2S$ in the hydrogen treat gas (this does not include $H_2S$ generated from the hydroconversion reaction).

The optimum exists for demetallization activity. However, it is also seen that gas ($C_1$-$C_4$) yield increases with increasing $H_2S$ concentration which will set an upper practical limit on $H_2S$ concentrations in refining situations where a premium is placed on liquid yield.

In Table 8 are summarized results of a set of experiments which show that oil solubility is needed for catalyst precursors used in forming the effective, solid, non-colloidal catalysts of the present invention. On an equivalent molybdenum concentration in feed basis, it is seen that oil insoluble $MoO_3$ powder (run 1R-22) showed little improvement over a molybdenum-free control run (6R-34). See also oil insoluble $MoO_3$ powder (run R-96), molybdic acid (run R-210) and $MoS_2$ (run R-340) in comparison to the runs utilizing oil-soluble catalyst precursors, that is, runs 7R-138; 7R-132; 1R-10 and 1R-45.

In contrast, the solid molybdenum containing catalyst formed in situ from a variety of oil-soluble molybdenum compound catalyst precursors (phosphomolybdic acid, molybdenum hexacarbonyl, molybdenum pentachloride, molybdenum resinate) gave good results.

In Table 9 are summarized results of experiments which showed that naturally occurring oil soluble metals contained in the feed were not effective for controlling the hydroconversion reaction, either on an "as is" basis, or after pretreat with a hydrogen and hydrogen sulfide-containing gas. Note the excessive yields of coke and light gas.

Figure 3:
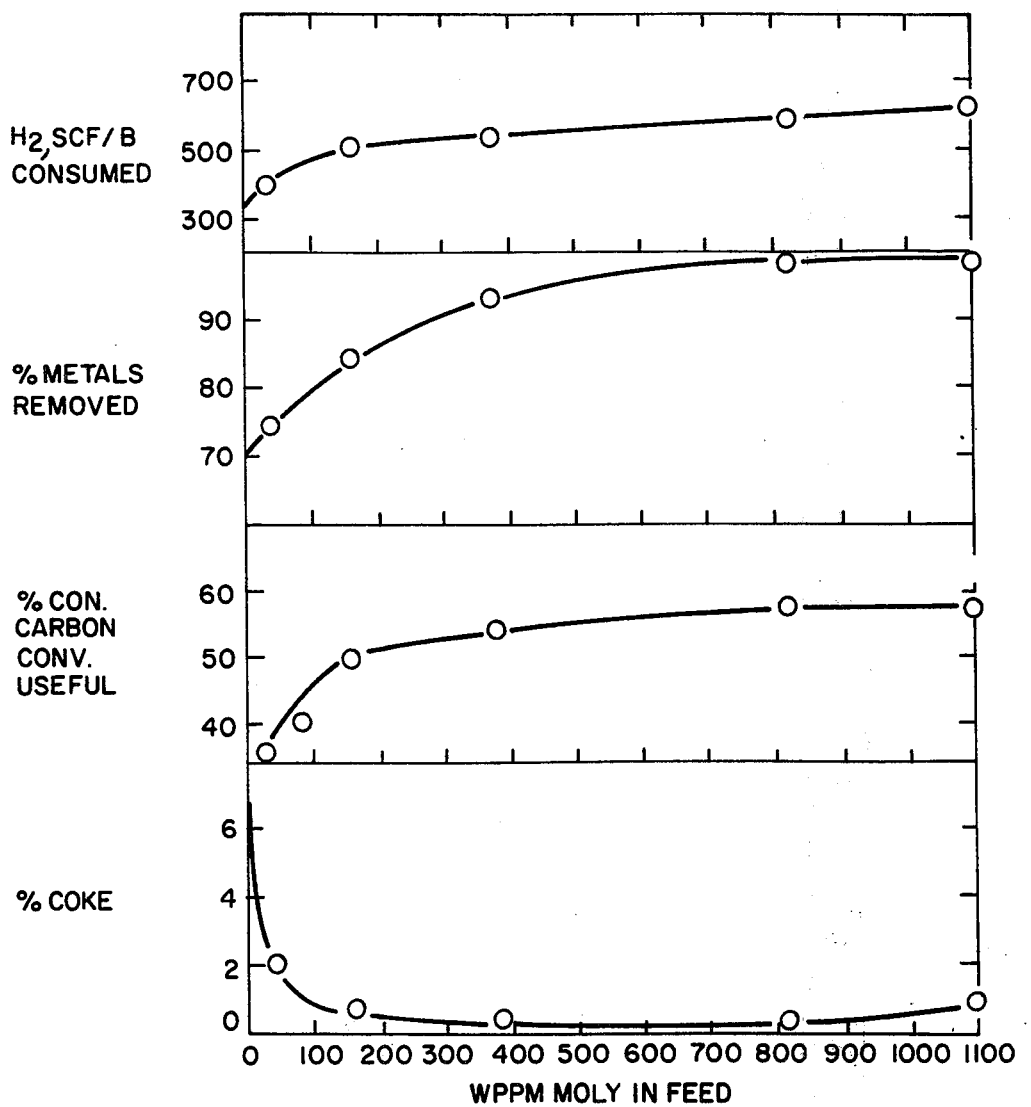
FIG. 3 is a plot showing the concentration effectiveness curve for trace molybdenum in the hydroconversion of Cold Lake Crude.

In FIG. 3 is shown a concentration effectiveness curve for the molybdenum catalyst of the present invention in the hydroconversion of Cold Lake Crude. Molybdenum resinate was used as the molybdenum catalyst precursor. The catalyst precursors were pretreated in situ with $H_2S$ (10%) plus $H_2$ at 385° C. (725° F.) for 30 minutes. The hydroconversion runs were conducted for 1 hour contact at 820° F. (437.7° C.) at a pressure of 2000+ psig. The molybdenum concentration in the runs was as follows:

| wppm Moly | Run No. |
| --- | --- |
| 40 | 6R-73 |
| 100 | 1R-55 |
| 171 | 6R-70 |
| 385 | 6R-69 |
| 820 | 6R-68 |
| 1100 | 6R-64 |

As can be seen from the plot, coke formation begins to increase as the metal concentration rises above about 900 wppm. Demetallization is quantitative well below 1000 wppm and gains in Conradson carbon conversion brought by increasing metal concentration were small. For example, doubling the molybdenum concentration (500 to 1000 wppm) had no significant effect on useful Conradson carbon conversion level (55% versus 56%).

Figure 4:
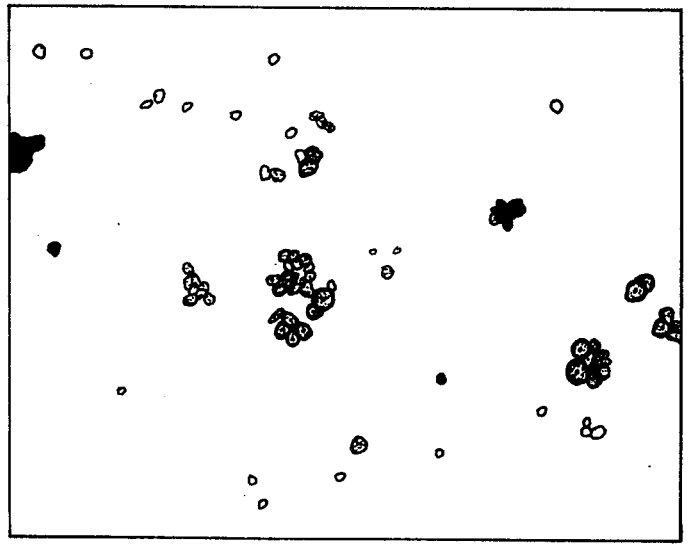
FIG. 4 is a graphical representation of a photograph of molybdenum-containing catalytic solids.

FIG. 4 is a graphical representation of a photograph of the molybdenum-containing solids recovered from hydroconversion runs of the present invention. The photograph from which this graphical representation was made was an optical microscope view of the catalytically active particles as they exist in the reactor liquid product (diluted with toluene). This sample was obtained in the hydroconversion of Cold Lake Crude with 350 wppm molybdenum (added as molybdenum naphthenate). It should be noted that the individual particles had a diameter of approximately 2 microns and were present in larger clusters (10 to 20 microns). The 2 micron particle size is significantly greater than colloidal size, i.e., from one to 200 millimicrons as defined in Glasstone's *Textbook of Physical Chemistry*, 2nd Edition, p. 1231, published by D. VanNostrand, 1946.

Figure 5:
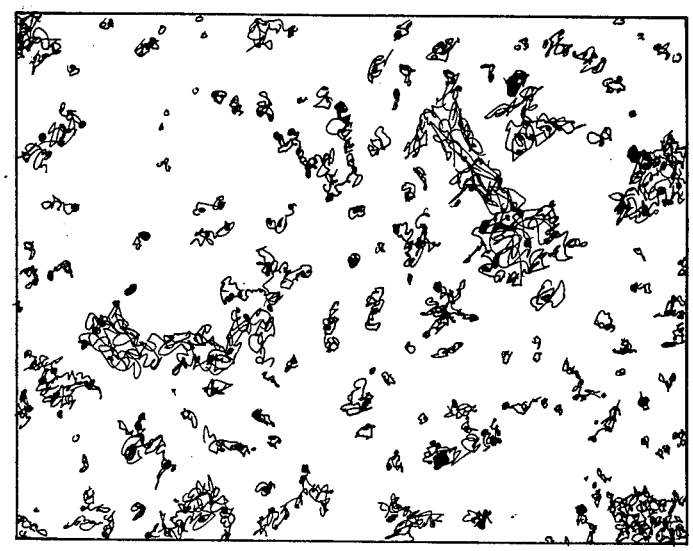
FIG. 5 is a graphical representation of another photograph showing molybdenum-containing catalytic solids.

FIG. 5 is a graphical representation of another photograph which shows the non-colloidal character of the molybdenum-containing solids (catalysts) of the present invention. This sample was obtained in a continuous unit run with Athabasca bitumen feed containing 180 wppm molybdenum (added as naphthenate). It should be noted that the individual particle size is of the order of 1 micron.

Table 10 summarizes the results of filtration runs carried out at hydroconversion reaction conditions. These runs show that (1) depending on feed, some 65 to 80% of the molybdenum containing solids obtained in the hydroconversion run are retained by a 10 micron filter, thereby supporting the particle size shown in FIGS. 4 and 5 and (2) that the molybdenum is associated with the solids at process conditions, i.e. about 80% of the available molybdenum was found with the 10 + micron solids at 438° C. and about 2500 psig reactor pressure.

Table 11 summarizes data of runs comparing the activity of recycle solids obtained from runs in which the catalyst precursor was molybdenum naphthenate and fresh catalyst prepared from molybdenum naphthenate for Athabasca bitumen hydroconversion. The runs were conducted at 830° F. (443.33° C.) and 2000+ psig hydrogen pressure for 60 minutes. In runs 153, 142 and 143, the solids filtered (therefore non-colloidal in size) from a molybdenum naphthenate run were utilized as catalyst. In run 145, a conventional supported molybdenum on high surface area carbon hydrotreating catalyst was utilized. It can be seen from the data that the non-colloidal recycle catalyst particles typical of those described in Table 10 and in FIGS. 4 and 5 have activity equivalent to fresh catalyst up to a concentration providing about 350 wppm molybdenum (compare run 2R-14 and 143) and are superior to fresh catalyst at concentrations above 350 wppm for suppressing coke formation (compare run 142 and 160). Also, it can be seen that the recycle solid catalyst (run 143) is superior to a fresh powdered conventional molybdenum-on-charcoal catalyst (run 145).

In Table 12 are summarized results of runs utilizing a mixture of molybdenum naphthenate catalyst precursor and recycle solids to provide maximum coke suppression while maintaining highly active, selective reactions for demetallization and Conradson carbon conversion. The efficacy of using recycle catalyst in combination with fresh catalyst for hydroconversion of Athabasca bitumen can be seen from the data in Table 12. The combination catalyst (run A) provided a more selective (i.e. less contribution to conversion by coking) Conradson carbon conversion and demetallization reaction than was obtained in runs using the comparable concentration of molybdenum as fresh catalyst (run E) or as recycle catalyst (run C). Furthermore, it can be seen that the low molybdenum concentration equivalent to the fresh molybdenum concentration of the combination catalyst (93 wppm) is relatively ineffective when tested alone as fresh catalyst (run B) or as recycle catalyst (run D).

Figure 6:
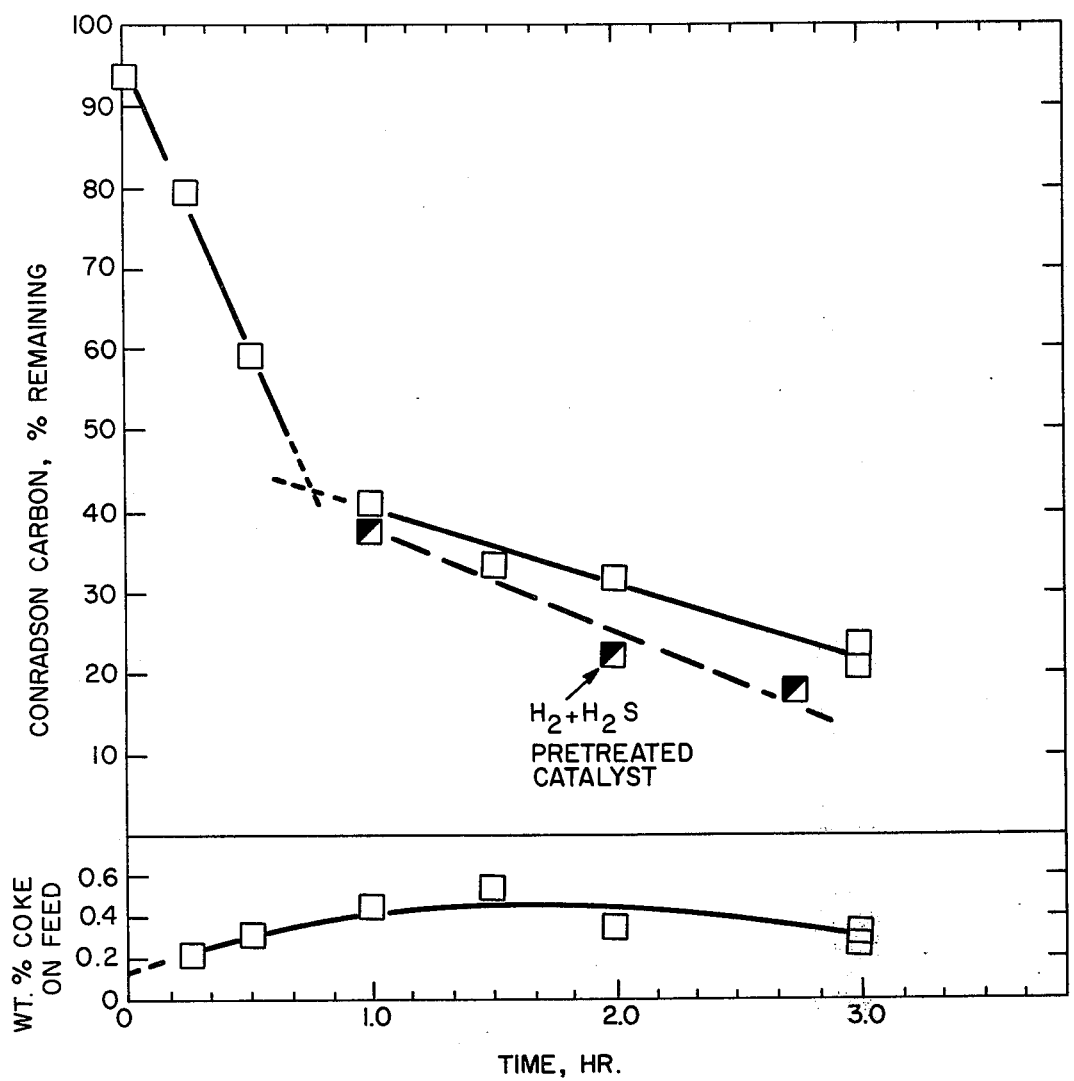
FIG. 6 is a plot showing the effect of contact time on bitumen hydroconversion.

FIG. 6 is a plot showing the effect of contact time on bitumen hydroconversion regarding Conradson carbon conversion and weight percent coke on feed. This plot shows that it is possible to obtain any desired level of Conradson carbon conversion including substantially complete conversion while holding coke yield well below 1 weight percent on feed. Data referred to in FIG. 6 were obtained in batch experiments.

Figure 7:
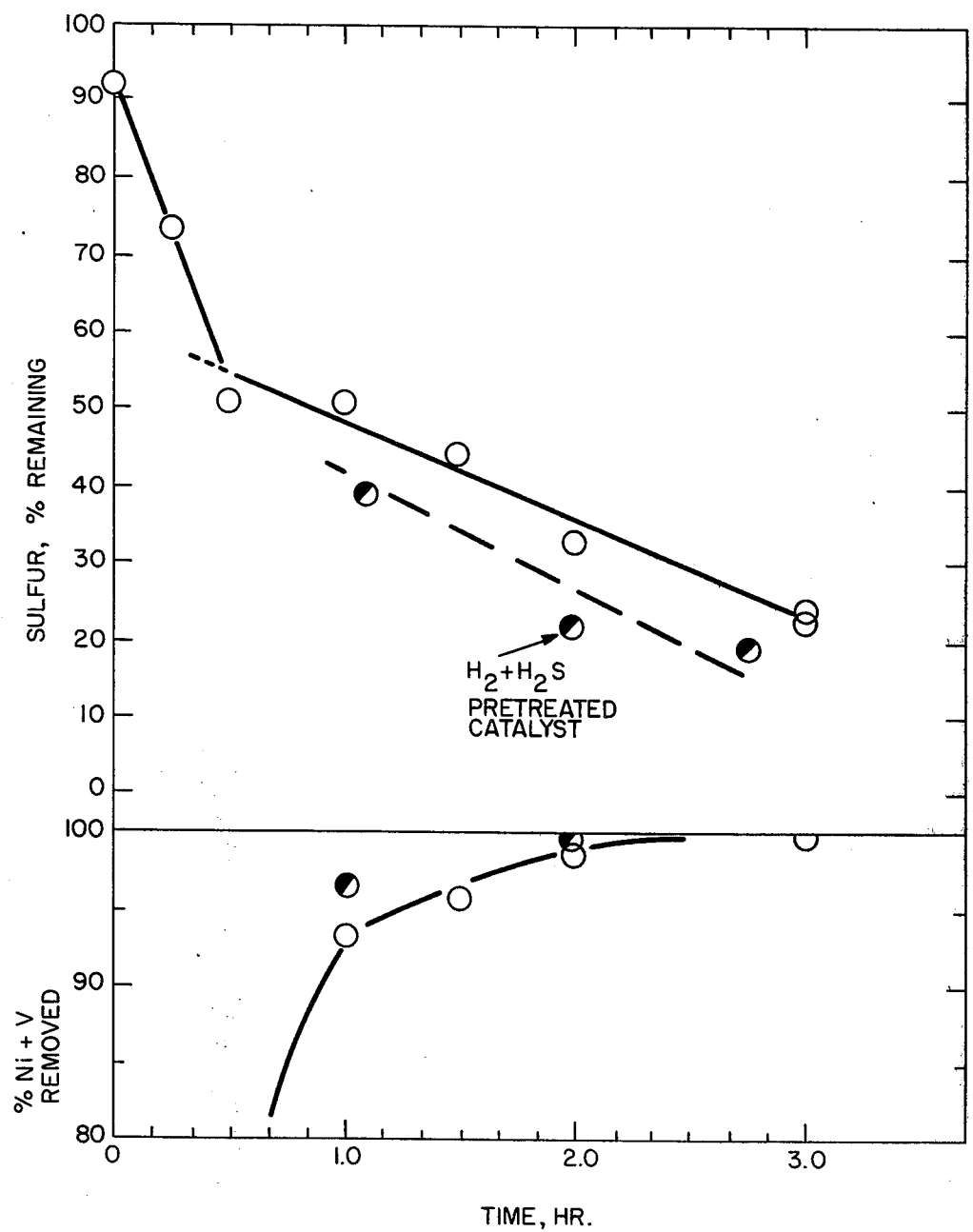
FIG. 7 is a plot showing the effect of contact time on bitumen hydroconversion with regard to sulfur removal and metals removal.

FIG. 7 is a plot showing the effect of contact time on bitumen hydroconversion regarding sulfur removal and demetallization. This plot shows that good desulfurization can be obtained and that desulfurization of up to about 80% can be obtained with low molybdenum concentration. The data of FIG. 7 were obtained from the same batch experiments as those of FIG. 6.

Figure 8:
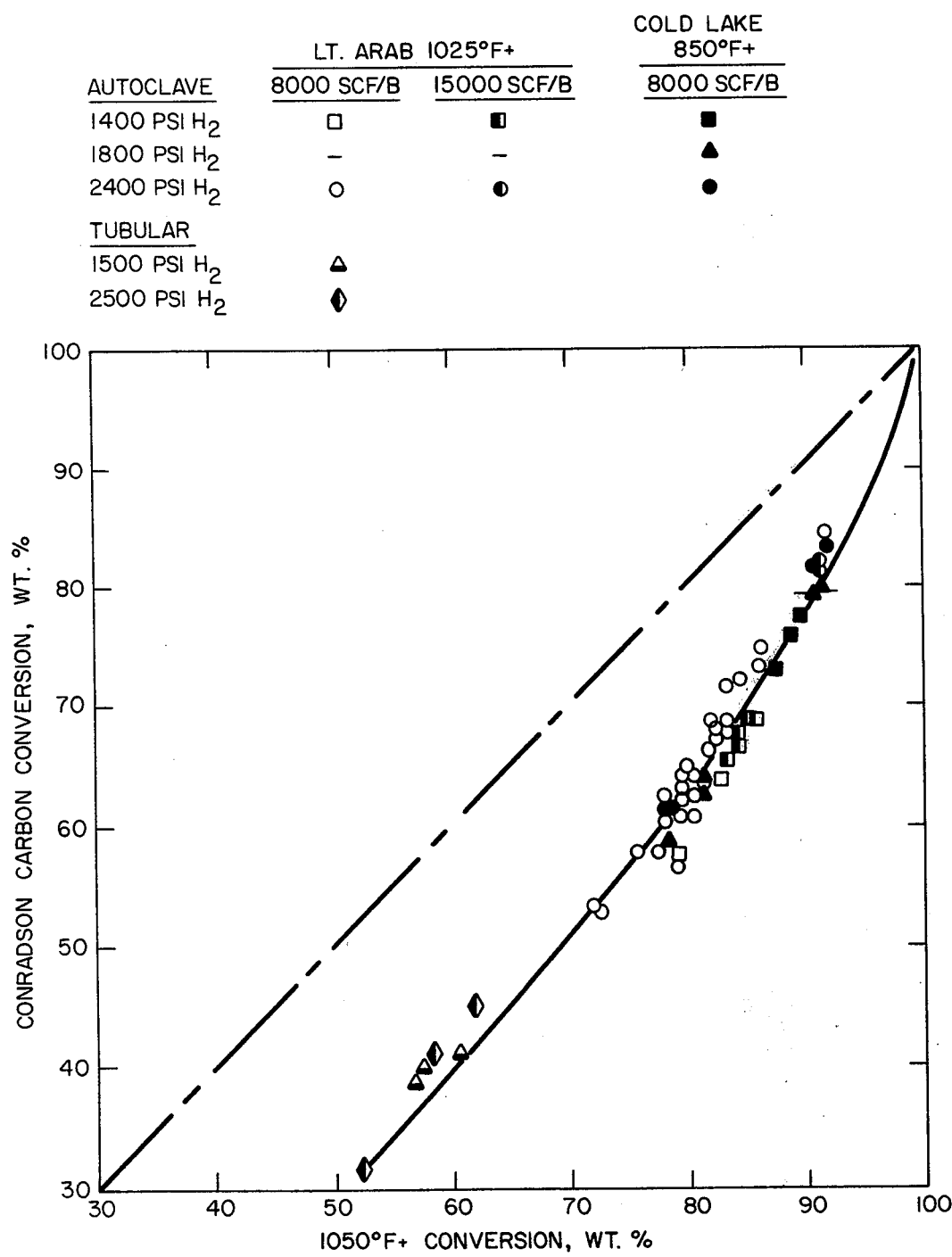
FIG. 8 is a plot showing the relation of Conradson carbon conversion relative to 1050° F.+ conversion.

FIG. 8 is a correlation between 1050° F.+ conversion and Conradson carbon conversion. The correlation was developed in continuous unit operations with a variety of heavy feeds using molybdenum concentrations from 100 to 350 wppmx on feed.

Table 13 shows results of continuous unit runs made with 100 wppm molybdenum on feed.

Table 14 shows the activity of catalysts of the present invention which were recovered in vacuum distillation bottoms. Recycle molybdenum containing solids used in run 230 were recovered from part of the total conversion product produced in continuous run PHCA 2-3 by filtration. Solids used in run 234 were recovered from distillation bottoms (by filtration) after the PHC product had been vacuum distilled. The activity of the catalysts (includes makeup molybdenum) were equivalent in both runs, thus demonostrating that solids concentration by distillation does not diminish catalyst activity, nor did the catalyst prevent product recovery by distillation.

Experiments were made to show that the active catalytic metal is present in non-colloidal form.

Results obtained in the set of examples given below have demonostrated the following facts about the non-colloidal catalyst of the present invention: (1) 90+% of the metal is present in non-colloidal form at time zero in the hydroconversion zone, (2) the metal is in non-colloidal form under process conditions, (3) the metal remains in noncolloidal form over the course of the hydroconversion reaction and (4) conversion that occurs prior to the formation of the non-colloidal catalyst is minimal.

Tests were made to see if a non-colloidal catalyst was present at the end of the pretreatment step. Two feeds were chosen for the test, a tar sand bitumen and Cold Lake Crude. The catalyst metal, molybdenum, was added as the naphthenate. At the end of the pretreatment step the viscous oil products were diluted with an equal volume of toluene and then filtered. Tests results, Table 15, show that a solid filterable material (about 0.3% based on feed) was produced with each feed and further that the filtered oil contained no significant concentration of the catalyst metal, in this case molybdenum.

Tests were made to determine whether or not the filtered non-colloidal solid containing the molybdenum is the active catalyst. Activity of the solid was compared with fresh molybdenum added to the feed as molybdenum naphthenate. As shown in Table 16, the filtered solids have activity equal to that of the soluble catalyst precursor molybdenum naphthenate, thus demonstrating that the noncolloidal solid is the active catalyst.

The following example shows that greater than 90% of the metal (molybdenum) is present in non-colloidal form at time zero in the hydroconversion zone even when the pretreatment step is omitted. Cold Lake Crude was chosen for the test. Molybdenum was added as molybdenum naphthenate. The mixture was heated as rapidly as possible under hydrogen pressure (2 mole % $H_2S$), to about 427° C., and then cooled rapidly to room temperature. Solids were recovered from the oil by filtration through a number 2 Whatman paper. Both the solids and filtered liquid were analyzed for molybdenum. The results, Table 17, show that 91.4% of the molybdenum was associated with the non-colloidal solids and 3.0% remained in the liquid. The remaining 5.6% was probably plated on reactor surfaces.

Inspections on the oil product obtained in the preceding example (heatup to 427° C., cool down) shows that no appreciable conversion had taken place prior to the formation of the non-colloidal catalyst. Results are summarized in Table 18 which shows that hydroconversion prior to the formation of the non-colloidal catalyst is minimal.

Data presented in Table 10 show that molybdenum is in non-colloidal form at hydroconversion process conditions and that the catalyst remains in non-colloidal form (98% molybdenum in filterable solids) throughout a typical conversion run.

TABLE 1
APPARATUS, GENERAL PROCEDURE AND CALCULATIONS

REACTOR
- A standard design 300 ml autoclave furnished by Autoclave Engineers, Inc. was used. Construction is entirely of Hastelloy-C. Gas-liquid contacting and mixing in general is provided by internal stirring. Reactor temperature is measured internally.
- Heatup time from ambient to run temperature is on the order of 25 minutes. Heat is provided by a self contained, removable, electric furnace.
- Cool down from reaction temperature to a thermally non-reactive temperature is accomplished within 1 minute by using both internal (water) and external cooling.

RUN PROCEDURE
- Feed and catalyst or catalyst precursor were loaded into the reactor, which was then flushed with hydrogen and given a 60 min. pressure test at ~2400 psig with hydrogen.
- With the reactor pressure tight and equilibrated at start of run conditions, i.e. about 2000 psig and 24–27° C., the reactor was vented down through a wet test meter to determine the hydrogen charge. The reactor was then repressured to the exact pre-vent conditions and the run begun.
- A run was seldom repressured on conditions. Normally, an excess of hydrogen was added initially.
- Reaction time or contact time was the actual time on conditions. No adjustments were made to compensate for heatup time.
- Pretreatment conditions (if used) are described in the data tables. If $H_2S$ plus $H_2$ were employed in the pretreat then the reactor was cooled to room temperature after pretreat, flushed with hydrogen and recharged with pure hydrogen for the run. When hydrogen alone was used in the pretreat there was no cool down after the pretreat, rather, temperature was raised directly to the run temperature.

PRODUCT RECOVERY
- The reactor was depressured at room temperature. Gas was scrubbed to remove $H_2S$ and the volume measured using a wet test meter. Composition was determined by mass spectrometry gas analysis.
- Solids were recovered by filtering the liquid product and by scouring reactor surfaces. The solids were washed free of adhering oil with toluene and then dried under vacuum. Carbon content of the solids was determined as burned carbon.

HYDROCONVERSION CALCULATIONS
- The percent desulfurization and percent demetallization values cited compare $C_5^+$ liquid product with feed. No attempt has been made to adjust for the contribution that coking has made to the desulfurization and demetallization results. It is known that coking is a significant contributor to the results in runs where coke formation is not inhibited, e.g. in control runs.
- Coke formation has been taken into account in the Conradson Carbon Conversion numbers. Since coke formation is a mechanism for Conradson Carbon conversion, but not useful for the present purposes, in the Conradson Carbon conversion calculated, the conversion to coke has been excluded.

Wt.Con.Carbon Converted-Wt. Coke Formed × 100 = % Converted
Wt.Con.Carbon in Feed

- The liquid sample on which analyses were run was obtained in the fitration step. In addition, liquid

TABLE 1-continued
APPARATUS, GENERAL PROCEDURE AND CALCULATIONS product adhering to the filtered solids and to reactor surfaces was picked up in toluene and subsequently recovered by stripping away the toluene. This material was periodically checked to make sure that its inspections agreed with those of the main liquid sample. Generally about 10–15% of the total liquid was recovered in the toluene wash. Material balances, overall, have ranged from 97 to 101%

TABLE 2
FEEDSTOCK INSPECTIONS

| Feed Designation | Jobo Crude | Cold Lake Crude | Athabasca Bitumen* | Lt. Arab. 1025° F.+ Btms. |
|---|---|---|---|---|
| Feedstock No. | 1 | 2 | 3 | 4 |
| API Gravity | 8.5 | 10.4 | 10.3 | 7.9 |
| Sulfur, Wt. % | 4.0 | 4.3 | 4.7 | 4.1 |
| Nitrogen, Wt. % | 0.7 | 0.44 | 0.43 | 0.28 |
| Carbon, Wt. % | 83.92 | — | 83.63 | 85.58 |
| Hydrogen, Wt. % | 10.49 | — | 10.47 | 10.43 |
| Oxygen, Wt. % | 0.57 | — | 0.75 | 0.16 |
| Conradson Carbon, Wt. % | 13.8 | 12.9 | 12.3 | 21.50 |
| Metals, ppm | | | | |
| Ni | 97 | 74 | 74 | 17 |
| V | 459 | 165 | 174 | 76 |
| Fe | 12 | 56 | 248 | 12 |
| Viscosity at 210° F. | 247 | 73 | — | — |
| Distillation | | | | |
| IBP, ° F. | 518 | 471 | 478 | — |
| 5% | 629 | 564 | 564 | 942 |
| 10% | 682 | 616 | 631 | 1030 |
| 20% | 798 | 727 | 728 | — |
| 30% | 895 | 835 | 823 | — |
| 40% | 978 | 925 | 934 | — |
| 50% | 1037 | 1019 | 1009 | — |
| 60% | — | — | 1024 | — |
| 70% | — | — | — | — |
| 80% | — | — | — | — |
| 90% | — | — | — | — |
| 95% | — | — | — | — |
| FBP | 1037 | 1042 | 1050 | 1030 |
| % Rec. | 51.8 | 55.0 | 58.0 | 10.5 |
| % Res. | 48.2 | 45.0 | 42.0 | 89.5 |

*Contains 0.6–0.7 Wt. % inorganic particulate matter

TABLE 3
CATALYSTS AND CATALYST PRECURSORS

Oil-soluble compounds used in forming the trace metal catalysts of this invention are listed below along with the name of the commercial supplier and any special conditions used in their application. Generally, the compounds were added to the residua feeds as received. Also listed are two solid catalysts that were tested:

Metal Resinates - These materials are supplied by Engelhard Industries and are described by Engelhard as metal-organic compounds that are soluble in hydrocarbons. The metal resinates that were tested along with their Engelhard identification number are as follows:
Molybdenum Resinate (~13.3% MO), No. 8605
Vanadium Resinate (3.9% V), No. 51-F
Chromium Resinate (9.6% Cr), No. 52-D
Cobalt Resinate (12% Co), No. A-1100

2. Molybdenum Naphthenate - A naphthenic acid salt containing 6 wt.% molybdenum supplied by Shepherd Chemical Co.
3. Molybdenum Pentachloride - Resublimed 99+% pure $MoCl_5$ obtained from Ventron Corporation.
4. Molybdenum Hexacarbonyl - $Mo(CO)_6$ powder obtained from Ventron Corporation.
5. Phosphomolybdic Acid - Crystalline material, $20 MoO_3.2H_3PO_4.48H_2O$, obtained from J. T. Baker Chemical Company. Dissolved in water prior to adding to resid feeds. Solution prepared using two parts by weight of water per part of the crystalline acid.
6. Nickel Octoate - purchased from Research Organic/Inorganic Chemical Corporation. Formula $Ni[COO(C_2H_5)CHC_4H_9]_2$. Furnished solvent free.
7. Iron Naphthenate - purchased from MC/B Manufacturing Chemists.
8. Molybdenum Trioxide-sublimed powder, 99.5% $MoO_3$ from MC/B Manufacturing Chemists.
9. Recycle Molybdenum-Solids Catalyst-Solid material

TABLE 3-continued
CATALYSTS AND CATALYST PRECURSORS recovered at end of hydroconversion runs, utilizing moly naphthenate, by filtration. Washed free of adhering oil with toluene. Toluene displaced with hexane and solids dried under vacuum.

10. Molybdenum Sulfide on Charcoal - a commercial catalyst containing about 10 wt.% $MoS_2$. The catalyst has a surface area of about 970 $m^2/g$ and a pore volume of 0.41 $cm^3/g$. Prior to use, the catalyst was ground to a powder which exhibited a particle size ranging from one to two microns.

TABLE 4
RELATIVE EFFECTIVENESS OF CATALYSTS PREPARED IN SITU FROM VARIOUS SOLUBLE METAL COMPOUNDS

- Catalysts pretreated in situ 30 min. at 385° C., 2400 psig with 10% $H_2S$ + 90% $H_2$ blend
- $H_2S$ containing gas replaced with pure hydrogen for hydroconversion reaction
- Hydroconversion reaction carried out at 438° C., 1 hr, 2500 psig avg. reactor pressure

| Run No. | 6R-21* | 6R-16 | 8R-15 | 6R-18 | 6R-47 | 6R-34* | 1R-33 | 2R-48 | 6R-68 |
|---|---|---|---|---|---|---|---|---|---|
| Feed | | Jobo | | | | | Cold Lake Crude | | |
| Catalyst Precursor | None | Nickel Octoate | Cobalt Resinate | Iron Naphthenate | Molybdenum Resinate | None | Vanadium Resinate | Chromium Resinate | Molybdenum Resinate |
| WPPM Metal on Feed | None | ~800 | ~800 | ~800 | 820 | None | 780 | 816 | 820 |
| Hydrogen consumed, SCF/B of feed | 302 | 523 | 507 | 479 | 618 | 336 | 599 | 637 | 650 |
| $C_1$-$C_4$) Wt. % on Feed | 6.8 | 3.9 | 3.4 | 5.2 | 3.5 | 6.5 | 3.0 | 2.6 | 2.3 |
| Coke, Wt. % on Feed | 7.2 | 0.7 | 0.8 | 2.8 | 0.7 | 5.5 | 0.5 | 0.5 | 0.5 |
| Liquid Product Conversion Summary | | | | | | | | | |
| Demetallization, % | 74 | 91 | 91 | 58 | 92 | 73 | 92 | 95 | 93 |
| Desulfurization, % | 33 | 44 | 41 | 43 | 60 | 35 | 42 | 55 | 64 |
| Conradson Carbon Conversion % (excludes conv. to coke) | 1.0 | 45 | 46 | 28 | 53 | 3 | 47 | 53 | 56 |

*Also given $H_2$ + $H_2S$ pretreat at 385° C. as in runs with soluble metal compounds.

TABLE 5
MILD $H_2S$ PREACTIVATION IMPROVES CATALST PERFORMANCE

Hydroconversion Reaction Conditions: 1 Hr., 438° C., ~2500 psig Avg. Reactor Pressure

| Run No. | 8R-43 | 8R-41 | 6R-16 | 6R-73 | 8R-15 | 6R-34 | 1R-37 | 1R-34 |
|---|---|---|---|---|---|---|---|---|
| Feed | | Jobo | | | | | Cold Lake Crude | |
| Catalyst Precursor | None | Nickel Octoate | Cobalt | Resinate | None | Vanadium | Resinate | |
| WPPM Metal on Feed | None | ~800 | ~800 | ~800 | ~800 | None | 350 | 350 |
| Pretreat Procedure | None | None | A. | None | A. | A. | B. | A. |
| $H_2$ Consumed, SCF/B of feed | 355 | 645 | 523 | 584 | 507 | 336 | 692 | 555 |
| Products, Wt. % on Feed | | | | | | | | |
| $C_1$-$C_4$ Gas | 6.8 | 3.7 | 3.9 | 3.9 | 3.4 | 6.5 | 3.9 | 2.5 |
| Coke | 9.2 | 2.7 | 0.7 | 3.4 | 0.8 | 5.5 | 1.5 | 0.4 |
| $C_5^+$ Liquid | ~84 | ~93 | ~95 | ~92 | ~96 | ~87 | ~94 | ~97 |
| Liquid Product Conversion Summary | | | | | | | | |
| Demetallization, % | 72 | 67 | 91 | 81 | 91 | 73 | 71 | 82 |
| Desulfurization, % | 28 | 44 | 44 | 41 | 41 | 35 | 40 | 43 |
| Con. Carbon Conversion, % (excludes conv. to coke) | 0 | 33 | 45 | 33 | 46 | 3 | 38 | 50 |

A. 30 min. at 385° C., 2400 psig, 10% $H_2S$ + 90% $H_2$. Reactor flushed, charged with pure hydrogen for run.
B. 30 min. at 385° C., 2400 psig, 100% $H_2$.

TABLE 6
EFFECT OF PRETREAT PROCEDURE ON GCOS BITUMEN HYDROCONVERSION WITH THE MOLYBDENUM CATALYST

Molybdenum Conc. on Feed: ~350 wppm, added as Molybdenum Resinate (Engelhard Ind.)
Hydroconversion Cond.: 1 Hr., 438° C., 2500 psig avg. reactor pressure

| Run No. | 1R-11 | 1R-12 | 1R-14 | 1R-17 | 8R-52 (Control, No Moly) |
|---|---|---|---|---|---|
| Pretreat Procedure | A | B | C | F | C |
| $C_1$—$C_4$ gas, wt. % on feed | 2.0 | 2.2 | 3.1 | 2.8 | 4.2 |
| Coke, wt. % on feed | 0.3 | 0.2 | 0.3 | 0.4 | 4.5 |
| Desulfurization, % | 59 | 57 | 52 | 57 | 34 |
| Demetallization (Ni+V), % | 87 | 87 | 93 | 92 | 55 |
| Conradson Carbon Conv., % (excluding conv. to coke) | 55 | 55 | 53 | 45 | 11 |
| API Gravity | 23.0 | 23.7 | 22 | 21.3 | 23 |

PRETREAT PROCEDURE
(A) 30 min. at 385° C., 2400 psig, 10% $H_2S$ + 90% $H_2$. Reactor flushed, recharged with pure hydrogen for run.
(B) 30 min. at 385° C., 2400 psig, 100% $H_2$.
(C) No pretreat.
(F) 1.5 Hr., at 350° C., 300 psig, 100% $H_2S$. Reactor flushed and recharged with pure hydrogen for run.

TABLE 7

EFFECT OF PRETREAT PROCEDURE ON COLD LAKE HYDROCONVERSION WITH MOLYBDENUM CATALYST

Molybdenum Conc. on feed: 350 wppm
Catalyst Precursor: Molybdenum Naphthenate
Hydroconversion Reaction Cond.: 1 Hr., 438° C., 2500 psig avg. Pressure

| Run No. | 1R-45 | 1R-73 | 1R-67 | 1R-75 | 6R-34 (Control, No Moly) |
|---|---|---|---|---|---|
| Pretreat Procedure | A | B | D | E | A |
| $C_1$-$C_4$, wt. % | 3.0 | 2.6 | 2.9 | 2.3 | 6.5 |
| Coke, wt. % | 0.4 | 0.5 | 0.5 | 0.6 | 5.5 |
| Desulfurization, % | 50 | 52 | 45 | 52 | 35 |
| Demetallization, % | 91 | 92 | 80 | 81 | 73 |
| Conradson Carbon Conv., % (excluding conv. to coke) | 50 | 50 | 44 | 48 | 0 |
| Liq. Prod. API Gravity | 21.6 | 23.3 | 21.5 | 22.2 | 19.5 |

PRETREAT PROCEDURE
(A) 30 min. at 385° C., 2400 psig, 10% $H_2S$ + 90% $H_2$. Reactor flushed, recharged with pure hydrogen for run.
(B) 30 min. at 385° C., 2400 psig, 100% $H_2$.
(D) 60 min. at 250° C., 300 psig, 100% $H_2S$. Reactor flushed, recharged with pure hydrogen for run.
(E) 60 min. at 343° C., 100 psig, 100% nitrogen. Reactor flushed, recharged with pure hydrogen for run.

TABLE 8

OIL SOLUBLE COMPOUND NEEDED FOR CATALYST PREPARATION

- Study made with Cold Lake Crude
- Hydroconversion reaction at 438° C., 1 Hr., 2500 psig avg. reactor pressure

| Run No. | 6R-34 | 1R-22 | 7R-138 | 7R-132 | 1R-10 | 1R-45 |
|---|---|---|---|---|---|---|
| Feed | | | | | | |
| Catalyst Precursor | None | $MoO_3$ Powder | Phospho Molybdic Acid | $Mo(CO)_6$ | $Mo(Cl)_5$ | Molybdenum Naphthenate |
| WPPM Metal on Feed | None | 385 | 382 | 390 | 350 | 350 |
| Pretreat Procedure | A | A | B | G | C | A |
| Coke Yield, Wt. % on Feed | 5.5 | 4.2 | 0.3 | 0.4 | 0.7 | 0.4 |
| $H_2$ Consumed, SCF/B | 336 | 455 | 822 | 874 | 687 | 741 |
| Liquid Product Conv. Summary | | | | | | |
| Demetallization (Ni + V), % | 73 | 75 | 87 | 88 | 91 | 91 |
| Desulfurization, % | 35 | 33 | 48 | 50 | 51 | 50 |
| Conradson Carbon Conv., % (excludes conv. to coke) | 3 | 14 | 49 | 48 | 47 | 50 |
| Run No. | | R-96 | R-210 | | R-340 | |
| Catalyst Precursor | | $MoO_3$ Powder | Molybdic Acid | | $MoS_2$ Powder | |
| WPPM Mo on Feed | | 385 | 380 | | 2069 | |
| Pretreat Procedure | | E | E | | B | |
| Coke, Wt. % on Feed | | 4.2 | 4.6 | | 4.6 | |
| Desulfurization, % | | 36 | 39 | | 33 | |
| Vanadium Removed, % | | 76 | 53 | | 77 | |
| Nickel Removed, % | | 71 | 65 | | 68 | |
| Conradson Carbon Conversion, % | | 47.3 | 51.9 | | 44.2 | |

PRETREAT PROCEDURES
(A) 30 min. at 385° C. under 2400 psig with 10% $H_2S$ + 90% $H_2$. Reactor flushed and recharged with pure $H_2$ for run.
(B) 30 min. at 385° C. under 2400 psig with 100% $H_2$.
(C) No pretreat used.
(G) Decomposed under nitrogen, 3 hrs. at 250° C. Reactor flushed and recharged with pure $H_2$ for run.
(E) 13% $H_2S$ in $H_2$ at 385° C. for 30 minutes, $2000^+$ psig.

TABLE 9

NATURALLY OCCURRING "SOLUBLE" METALS HAVE LOW ACTIVITY EVEN WITH PRETREATMENT STEP

- Hydroconversion Reaction at 438° C., 1 Hr., 2500 psig avg. reactor pressure

| Run No. | 6R-32 | 6R-34 | 6R-42 | 6R-21 |
|---|---|---|---|---|
| Feed Designation | —Cold Lake— | | —Jobo Crude— | |
| Soluble Metals Content | | | | |
| Wppm Ni/V/Fe | —74/165/56— | | —97/459/3— | |
| Pretreat Procedure | None | A | None | A |
| $H_2$ Consumed, SCF/B | 325 | 336 | 355 | 302 |
| Coke, Wt. % on Feed | 6.7 | 5.5 | 9.1 | 7.2 |
| $C_1$-$C_4$ Gas, Wt. % on Feed | 5.5 | 6.5 | 7.1 | 7.5 |
| Liquid Product Conversion Summary | | | | |
| Demetallization, % | 77 | 73 | 81 | 74 |
| Desulfurization, % | 36 | 35 | 28 | 36 |
| Conradson Carbon Conversion, % (excludes conv. to coke) | 0 | 3 | 0 | 0 |

PRETREAT PROCEDURE
(A) 30 min. at 385° C., 2400 psig, 10% $H_2S$ + 90% $H_2$. Reactor flushed, recharged with pure hydrogen for run.

TABLE 10
RECOVERY OF MOLYBDENUM CONTAINING CATALYST AT REACTION CONDITIONS

- Molybdenum added as naphthenate, 350 wppm on feed
- 30 min. pretreat with $H_2$ at 385° C., 2400 psig
- Hydroconversion at 435° C., 1 Hr., 2500 psig avg. pressure
- Liquid filtered from reactor, on conditions, using internal metal frit filter. Retains 10-15 micron particles.

| Run No. | 2R-43 | 2R-44 |
|---|---|---|
| Feed | Cold Lake | Bitumen |
| Grams solids* produced per 100 g. of feed | 0.83 | 0.91 |
| % retained by 10-15 micron filter | 66 | 80 |
| % passed by 10-15 micron filter** | 34 | 20 |
| Grams moly present per 100 g. of feed | 0.0336 | 0.0348 |
| % recovered with solids > 10 microns | 80 | 79 |
| % recovered with solids < 10 microns | 18 | — |

*composite of coke, naturally occurring particulate matter, demetallization products, catalyst metal.
**recovered by filtration at room temperature using a No. 2 Whatman filter paper.

TABLE 11
COMPARISON OF RECYCLE SOLIDS WITH FRESH CATALYST PREPARED USING MOLYBDENUM NAPHTHENATE
Athabasca Bitumen, 830° F., 2000+ psig Hydrogen Pressure, 60 Min.

| Run No. | 159 | 153 | 160 | 142 | 2R-14 | 143 | 145 | 146 |
|---|---|---|---|---|---|---|---|---|
| Catalyst Name | Mo Naph. | Recycle Solids | Mo Naph. | Recycle Solids | Mo Naph. | Recycle Solids | *X | None |
| ppm Mo | 1512 | 1484 | 741 | 760 | 350 | 315 | 383 | 0 |
| Con. Carbon Conversion, % | 70 | 60 | 64 | 57 | 58 | 57 | 62 | 52 |
| Coke, % on Feed | 0.07 | 0.04 | 0.38 | 0.15 | 0.54 | 0.46 | 2.08 | 3.78 |
| Coke Producing Factor g. Coke Made / g. Con. Carbon Converted | 0.07 | 0.005 | 0.045 | 0.02 | 0.07 | 0.06 | 0.25 | 0.54 |
| Ni & V Removal, % | 98 | 94 | 92 | 80 | 82 | 79 | 89 | 61 |
| Metal Removal Factor % Metal Removal | 140 | 2350 | 242 | 533 | 152 | 172 | 43 | 16 |
| % of Coke Made | | | | | | | | |

*X = conventional catalyst

TABLE 12
Athabasca Bitumen, 830° F., 2000 + psig Hydrogen Pressure, 60 min.

| Run | A | B | C | D | E |
|---|---|---|---|---|---|
| Mo Naphthenate ppm Mo | 93 | 93 | — | — | 800 |
| Recycle Solids ppm Mo | 800 | — | 800 | 93 | — |
| Con. Carbon Conversion % | 58 | 58 | 58 | 54 | 64 |
| Coke, % on Feed | 0.14 | 2.20 | 0.16 | 1.85 | 0.37 |
| Coke Producing Factor g. coke Made / g. Con. Carbon Converted | 0.018 | 0.29 | 0.020 | 0.27 | 0.05 |
| Ni + V Removal, % | 86.5 | 63 | 84.5 | 52 | 93 |

TABLE 12-continued
Athabasca Bitumen, 830° F., 2000 + psig Hydrogen Pressure, 60 min.

| Run | A | B | C | D | E |
|---|---|---|---|---|---|
| Metal Removal Factor % Metals Removal | 618 | 29 | 528 | 28 | 251 |
| % of Coke Made | | | | | |

TABLE 13
CONTINUOUS UNIT CONVERSION RUNS
100 wppm Mo on feed
Mo added as moly naphthenate

| PHC Run No. | 17A-10 | 17A-13 |
|---|---|---|
| Feedstock | 4 | 2 |
| Conditions | | |
| Temp., ° F. | 834 | 835 |
| Pressure, psig | 2527 | 2442 |
| LHSV | 0.34 | 0.34 |
| Gas Rate, SCF/B | 7934 | 8043 |
| % $H_2S$ in Treat Gas | 5 | 5 |
| Results | | |
| Conradson Carbon Conv., % | 73.1 | 83.2 |
| 1050° F. + Conv., % | 86.2 | 92.0 |
| Desulfurization, % | 63.6 | 76.1 |
| Nickel Removed, % | 76.7 | 89.5 |
| Vanadium Removed, % | 93.3 | 97.8 |

TABLE 14
ACTIVITY OF SOLIDS RECOVERED FROM DISTILLIATION BOTTOMS
Athabasca Bitumen, 830° F., NO PRETREAT
2000+ PSIG $H_2$

| Run No. | 230 | 234 |
|---|---|---|
| Feedstock No. | 3 | 3 |
| Recycle Solids Source | PHCA 2-3 (Filtered from total reactor product) | PHCA 2-3 (Filtered from vac.dist.btms.) |
| PPM Mo | 289 | 294 |
| Mo Naphthenate, PPM Mo | 57 | 58 |
| Yields | | |
| $C_1$—$C_4$ | 3.09 | 2.97 |
| Coke | 0.25 | 0.27 |
| Liq. | 96.66 | 96.76 |
| Desulfurization, % | 47 | 43 |
| Ni Removal, % | 73 | 81 |
| Fe Removal, % | 98 | 98 |
| V Removal, % | 97 | 95 |
| Con. Carbon Conv., % | 52 | 55 |
| CPF | 0.038 | 0.039 |
| $H_2$ Consumption, SCF/B | 862 | 838 |
| API Gravity, 60° F. | 22.4 | 22.2 |

TABLE 15
SOLUBLE MOLYBDENUM CONVERTED TO FILTERABLE (NON-COLLOIDAL) CATALYST IN PRETREATMENT STEP

- Mo added as the naphthenate
- Pretreat Cond. 725° F., 30 min., ~2400 psig with 13 mole % $H_2S$, 87% $H_2$
- Solids recovered by filtration (#2 Whatman paper retains >4 micron)

| Run No. | 4R-10 | 4R-11 |
|---|---|---|
| Feed | Bitumen | Cold Lake |
| Wppm Mo in Feed | 350 | 367 |
| Filtered Solids, wt. % on Feed | 0.89* | 0.28 |
| Wppm Mo in Filt. Oil | <1 | <1 |

*About 73% clay

TABLE 16
NON-COLLOIDAL SOLID IS THE ACTIVE CATALYST
(ATHABASCA BITUMEN HYDROCONVERSION at 830° F., 1 HR. 2000+ PSIG HYDROGEN)

| Run No. | 4-R-18 | 2-R-14 |
|---|---|---|
| Wppm Mo on Feed | 330 | 350 |
| Mo Source | Solids from Pretreat Run 4R-10 | Mo Naphthenate |
| Coke, Wt. % on Feed | 0.3 | 0.5 |
| Desulfurization, % | 48 | 48 |
| Demetallization (Ni + V), % | 82 | 82 |
| Con. Carbon Conv., % | 56 | 56 |
| Product API | 22.8 | 22.5 |

TABLE 17
MOLYBDENUM PRESENT IN NON-COLLOIDAL FORM AT TIME ZERO IN CONVERSION
(Run 21-R-50)

- Molybdenum added as the naphthenate
- Reactor heated rapidly to 800° F. then cooled rapidly
- Gas charged at room temperature; 2000 psig $H_2$, 100 psig $H_2S$
- Solids recovered by filtration (#2 Whatman paper)

|  | Grams | Wt. % |
|---|---|---|
| Molybdenum Added to Oil | 0.0330 |  |
| Molybenum Recovered in: |  |  |
| Filtered Solids | 0.0302 | 91.4 |
| Filtered Oil | 0.0010 | 3.0 |

TABLE 18
CONVERSION MINIMAL PRIOR TO FORMATION OF NONCOLLOIDAL CATALYST
(Run 21-R-50)

| Inspections | Feed | Product | % Conv. |
|---|---|---|---|
| Sulfur, wt. % | 4.3 | 4.0 | 6.9 |
| Nickel, ppm | 74 | 74 | 0.0 |
| Vanadium, ppm | 165 | 164 | ~0.0 |
| Conradson Carbon, wt. % | 12.9 | 11.3 | 12.4 |

What is claimed is:

1. A process for hydroconverting a heavy hydrocarbon oil chargestock having a Conradson carbon content of at least 5 weight percent, which comprises:
   (a) adding to said chargestock an oil-soluble metal compound in an amount ranging from about 10 to about 950 weight parts per million, calculated as the elemental metal, based on said oil chargestock, said metal being selected from the group consisting of Groups IVB, VB, VIB, VIIB and VIII of the Periodic Table of Elements and mixtures;
   (b) converting said oil-soluble metal compound to a solid, non-colloidal catalyst within said oil in the presence of a hydrogen-containing gas by heating said oil to an elevated temperature, said catalyst comprising from about 10 to about 950 weight parts per million of said added metal, calculated as the metal, based on said oil chargestock;
   (c) reacting the oil containing said catalyst with hydrogen under hydroconversion conditions, in a hydroconversion zone, to effect at least a 50 percent conversion of said Conradson carbon content of said heavy hydrocarbon oil chargestock, and
   (d) recovering a hydroconverted hydrocarbon oil.

2. The process of claim 1 wherein said oil-soluble metal compound is selected from the group consisting of inorganic metal compounds, salts of organic acids, organometallic compounds and salts of organic amines.

3. The process of claim 1 wherein said oil-soluble metal compound is selected from the group consisting of salts of acyclic aliphatic carboxylic acids and salts of alicyclic aliphatic carboxylic acids.

4. The process of claim 1 wherein said oil-soluble metal compound is a salt of a naphthenic acid.

5. The process of claim 1 wherein the metal constituent of said oil-soluble metal compound is selected from the group consisting of molybdenum, chromium and vanadium.

6. The process of claim 1 wherein said oil-soluble metal compound is molybdenum naphthenate.

7. The process of claim 1 wherein said hydrogencontaining gas of step (b) comprises from about 1 to 90 mole percent hydrogen sulfide.

8. The process of claim 1 wherein said hydrogencontaining gas of step (b) comprises from about 1 to 10 mole percent hydrogen sulfide.

9. The process of claim 1 wherein said oil-soluble metal compound is converted to said solid, non-colloidal catalyst by subjecting said mixture to a temperature ranging from about 325° C. to about 538° C.

10. The process of claim 1 wherein said oil-soluble metal compound is converted to said solid non-colloidal catalyst by first heating the oil chargestock containing the added metal compound to a temperature ranging from about 325° C. to about 415° C. in the presence of said hydrogen-containing gas to form a catalyst within said oil chargestock and subsequently reacting the oil containing said catalyst with hydrogen under hydroconversion conditions.

11. The process of claim 10 wherein said oil-soluble metal compound is converted to said solid, non-colloidal catalyst in the presence of a gas containing hydrogen and hydrogen sulfide.

12. The process of claim 1 wherein said oil-soluble metal compound is converted to said solid, non-colloidal catalyst in the presence of a hydrogen-containing gas under hydroconversion conditions thereby forming said catalyst in situ in said oil in said hydroconversion zone and producing a hydroconverted oil.

13. The process of claim 1 wherein said hydroconversion conditions include a temperature ranging from about 343° C. to about 538° C. (650 to 1000° F.) and a hydrogen partial pressure ranging from about 500 to about 5000 psig.

14. The process of claim 1 wherein said oil soluble metal compound is added to said oil chargestock in an amount ranging from about 50 to about 200 wppm, calculated as the elemental metal, based on said oil chargestock, and wherein said oil soluble metal compound is phosphomolybdic acid.

15. In the process of claim 1 wherein the reaction product resulting from step (c) comprises a hydroconverted oil containing catalytic solids, the additional steps which comprise separating at least a portion of said catalytic solids from said hydroconverted oil and recycling at least a portion of said catalytic solids to step (a) or to step (c).

16. The process of claim 1 wherein said catalyst is the sole catalyst in said hydroconversion zone.

17. The process of claim 1 wherein said oil-soluble metal compound is a molybdenum compound.

18. The process of claim 17 wherein said hydrogen-containing gas comprises from about 2 to about 7 mole percent hydrogen sulfide.

19. In the process of claim 17 wherein the effluent of said hydroconversion zone comprises a hydroconverted oil and solids, the improvement which comprises the additional steps of separating at least a portion of said solids from said effluent and recycling at least a portion of the separated solids to said hydroconversion zone.

20. A process for hyroconverting a heavy hydrocarbon oil chargestock which comprises:
(a) reacting said oil with a hydrogen-containing gas under hydroconversion conditions in the presence of at least a portion of the catalytic solids of claim 15.

* * * * *